United States Patent [19]

Imigawa et al.

[11] 4,231,018
[45] Oct. 28, 1980

[54] TONE SIGNAL DETECTOR

[75] Inventors: Masayuki Imigawa; Toshihiro Mori, both of Tokyo, Japan

[73] Assignee: Nippon Electric Co., Ltd., Tokyo, Japan

[21] Appl. No.: 854,868

[22] Filed: Nov. 25, 1977

[30] Foreign Application Priority Data

Nov. 26, 1976 [JP] Japan ................................ 51-141860

[51] Int. Cl.² ........................ G01R 23/02; H04Q 9/00
[52] U.S. Cl. ............................ 340/171 R; 235/92 TF;
455/31; 324/78 D; 328/136
[58] Field of Search ......... 340/171 R, 171 PF, 168 B;
328/136, 140; 324/78 R, 78 D; 235/92 TF;
325/55, 64

[56] References Cited

U.S. PATENT DOCUMENTS

| | | | |
|---|---|---|---|
| 3,670,242 | 6/1972 | McGarvey .................. | 340/171 R X |
| 3,803,429 | 4/1974 | Wieczorek et al. ................ | 307/304 |
| 3,806,876 | 4/1974 | Kniel et al. ...................... | 340/171 R |
| 3,882,466 | 5/1975 | Poorvin ......................... | 340/171 PF |
| 3,949,177 | 4/1976 | Ball et al. ....................... | 324/78 D |
| 4,016,371 | 4/1977 | Hammad ....................... | 324/78 D |
| 4,020,418 | 4/1977 | Burrage ........................ | 324/78 D |
| 4,029,274 | 6/1977 | Sibley ............................ | 340/168 R |
| 4,127,846 | 11/1978 | Mori et al. ..................... | 340/171 PF |

Primary Examiner—Donald J. Yusko
Attorney, Agent, or Firm—Sughrue, Rothwell, Mion, Zinn and Macpeak

[57] ABSTRACT

A digital tone signal detector having N-path filters eliminates the need for a variable-frequency active filter and makes possible the use of integrated circuits in paging receivers, transceivers, mobile radio equipment and so forth. The tone signal detector comprises a clock pulse generator, an N-path filter (where N is an integer equal to or greater than 2), a low-pass filter, a wave shaping circuit, a gate circuit, a counter and detection circuitry. The clock pulse generator generates clock pulses of a predetermined frequency Fc equal to N times the frequency fo of tone signals. The N-path filter samples and selects the tone signal of the frequency fo according to the output of the clock pulse generator. The low-pass filter converts the sampled tone signal including the clock frequency component into a form close to sine wave to eliminate the clock frequency component. The wave shaping circuit shapes the output of the low-pass filter to produce pulses, and the gate circuit passes the clock pulses in accordance with the output of the wave shaping circuit. The counter is connected to the output of said gate circuit to count the number of the output pulses of the gate circuit. The detection circuitry is connected to the counter to detect whether or not the received tone signals are the designated tone signals by the count accumulated by the counter in a prescribed period of time.

3 Claims, 3 Drawing Figures

TONE SIGNAL DETECTOR

BACKGROUND OF THE INVENTION

This invention relates to tone signal detectors for paging receivers, transceivers, mobile radio equipment and so forth, and more particularly it pertains to digital tone signal detectors having N-path filters.

A conventional tone signal detector (reference is made to U.S. Pat. No. 3,882,466, 3,803,429 or 3,670,242) is composed of selective elements (for example, active filters) for selecting tone signals, an amplifier for amplifying these output signals and an analogue detecting circuit for converting these output signals into D.C. voltages and giving detecting pulses. Since the recent increase in number of channels (radio frequencies) per receiver has resulted in a greater number of selective elements required and the size of receivers has also enlarged, reductions are called for in the size of selective elements and detecting circuits and in the number of selective elements. To satisfy these needs, some tone signal detectors are provided with a variable-frequency active filter in place of a plurality of selective elements, and the pass frequency of the active filter is switched from one to another of the tone signal frequencies by an electronic circuit. However, since the center frequency, band width and voltage gain of such an active filter are dependent on the performance of resistors and capacitors constituting it, the resistances and capacitances, respectively, of these resistors and capacitors have to be highly precise, a requirement which hampers the use of integrated circuits, mass-production and cost reduction.

Moreover, even where an active filter is used, the filter output is often handled in practice by an analogue detecting circuit.

SUMMARY OF THE INVENTION

An object of this invention is to provide a more reliable tone signal detector with reduced size by using an N-path filter in place of an active filter with its aforementioned defects and by further using a digital detecting circuit.

In accordance with the present invention, there is provided a tone signal detector for receiving and passing tone signals, which comprises at least a clock signal generator for generating clock signals of a frequency equal to N times (where N is an integer) the frequency of said tone signals, an N-path filter for selecting said tone signals according to the output of said generator, a low-pass filter connected to said N-path filter for eliminating the frequency component of said clock signals, a wave shaping circuit for shaping the signals passing said low-pass filter, a gate circuit for controlling said clock signals in accordance with the output of said wave shaping circuit, a counter for counting the number of the output pulses of said gate circuit, and a means for detecting whether or not said tone signals are the designated signals by the count of said counter in a prescribed period of time.

BRIEF DESCRIPTION OF THE DRAWINGS

The invention will be described in detail below with reference to the accompanying drawings.

DETAILED DESCRIPTION OF THE INVENTION

Figure 1:
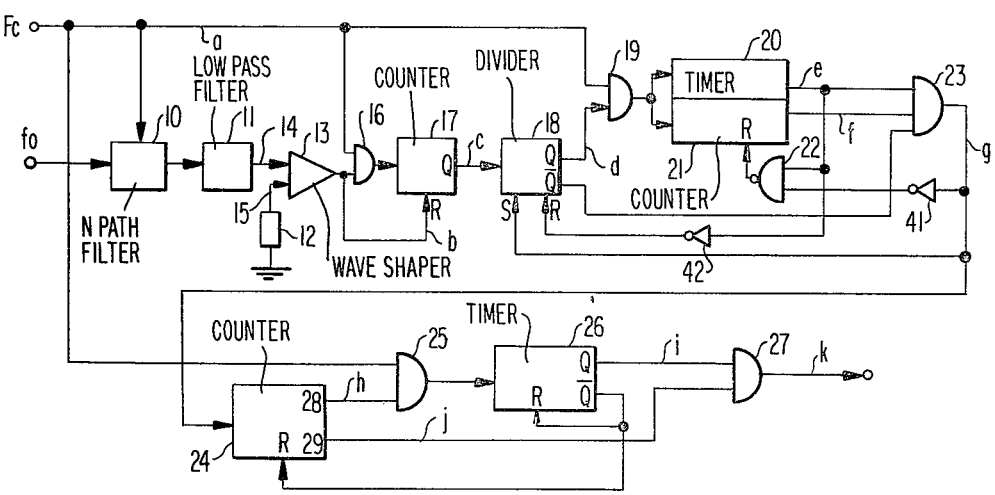
FIG. 1 is a block diagram of a tone signal detector constructed in accordance with the present invention.
Figure 2:
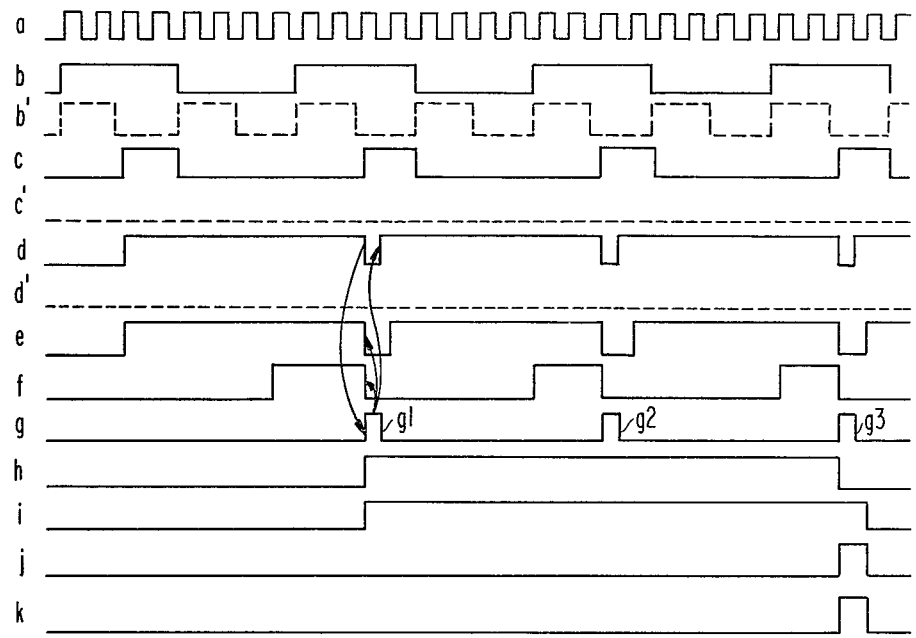
FIG. 2 is a time chart illustrating the wave forms of different parts of the block diagram of FIG. 1.

In FIG. 1, a clock pulse generator for generating clock pulse comprises a crystal resonator 150, a variable frequency divider 101, terminals 50 to 53, a switch 102 and a battery 103. The switch 102 gives a high level signal (tone designating signal) through one of the terminals 50 to 53 to the variable frequency divider 101. The variable frequency divider 101 divides the output frequency of crystal resonator 100 according to the high level signal and generates the output of clock frequency Fc. The clock frequency output is fed to N-path filter 10. The N-path filter 10 comprises a resistor, a plurality of capacitors and a plurality of switches as disclosed in Frank et al. "An alternative Approach to the Realization of Network Function: The N-path Filter." B.S.T.J., September 1960, pp. 1,321–1,350 and William R. Harden "Digital filters with IC's boost Q without inductors," Electronics, July 24, 1967, pp. 91–100. In the description, the N-path filter 10 has N (=8) switch circuits. Accordingly, a relationship of $F_c = 8 \times f_o$ is given, where $F_c$ stands for the clock frequency of the N-path filter and $f_o$ stands for the pass frequency of the N-path filter. This invention is intended for detection of the presence or absence of signals, by counting clock pulses, taking this relationship into consideration. The operation of the tone signal detector of FIG. 1 will be described below with reference to the time chart of FIG. 2. The N-path filter 10 of FIG. 1 receives clock signals whose frequency is $F_c$ ($=8 \times f_o$) (FIG. 2a) and tone signals. In the N-path filter 10, the tone signal of the frequency fo ($=F_c/8$) is sampled and selected by the clock pulse, and is fed to the low-pass filter 11 which converts the sampled tone signal including the clock frequency component into a form close to sine wave to eliminate the clock frequency component. The output of the low-pass filter 11 is fed to one input terminal 14 of the amplitude comparator 13. Meanwhile, a reference voltage 12 is applied to the other input terminal 15 of the amplitude comparator 13. In the amplitude comparator 13, the signals which have passed the low-pass filter 11 are shaped into square waves. Thus, shaped tone signals (FIG. 2b) are fed to one of the input terminals of the AND gate 16 as gate control signals to control the passage of clock pulses fed to the other input terminal. The gate 16 is opened only for a half period of a tone signal each time to let clock pulses pass. The clock pulses which have passed the AND gate 16 are fed to the $n_1$-nary (ternary in this example) counter 17.

The value of $n_1$ is selected here in the following manner. In an N-path filter, the number of clock pulses that can be counted in half the period of a tone signal is N/2, and if some other signal of a different frequency is entered, the gate time will be different, resulting in a different number of clock pulses counted. If, for instance, the frequency of the tone signal is twice as high, the count will be N/4. Thus, response to a higher frequency can be restricted by limiting the count $n_1$ within the range of $N/4 < n_1 \leq N/2$. Since N equals 8 in this embodiment of the present invention, $n_1$ will be either 3 or 4, and is supposed to be 3 in this example. When three clock pulses are entered into this ternary counter 17, the output thereof rises to a higher level as indicated in FIG. 2c, and the counter is automatically reset by the lower-level output of the comparator 13 (FIG. 2b). In this manner, the same action is repeated in every period in response to the desired signal. However, if at least three clock pulses are present in a half period of the input signal, this ternary counter 17 will simply produce output pulses. Thus, when the frequency is lower than that of the desired tone signal or when there is such a burst-like noise as will let three clock signals pass, the counter 17 will produce output pulses. However, this is avoided by requiring the output pulses of said ternary counter 17 to have a certain periodicity. The manner in which this is accomplished is elaborated upon below.

The output signal of this ternary counter 17 (FIG. 2c) rises to a higher level as soon as it is fed to the ½ frequency dividing circuit 18 (composed of a flip-flop) included in a frequency decision circuit 200, and is again brought down to a lower level by the output of the ternary counter 17 generated in the next period of the tone signal. Therefore, the period of time during which the output of this ½ frequency dividing circuit 18 (FIG. 2d) is at the higher level corresponds to a period of the tone signal.

The output of the ½ frequency dividing circuit 18 is fed to one of the input terminals of the AND gate 19 as a control signal which controls the passage of clock pulses fed to the other input terminal. If the count $n_2$ of these passing clock pulses is within the range of $N-\alpha \leq n_2 \leq N+\alpha$, the tone signal will be identified as the desired one according to the timer 20 (for example, CD4020A type Binary Counter. By establishing such a range, therefore, the discrepancy in frequency of tone signals and burst-like noises can be eliminated. It is provided, however, that the term $\alpha$ is a constant determined on the basis of a margin due to such factors as deformation of waves. In this embodiment, $N=8$, $\alpha=2$, and $n_2=6$ or 10. Accordingly, the timer 20 is a decimal unit and the counter 21 is a sexenary unit.

The following description will particularly concern the timer 20 and counter 21. Clock pulses which have passed the gate circuit 19 while the output of said ½ frequency dividing circuit 18 is at the high level are fed to the decimal timer 20 (though the level drops when 10 clock signals have been counted) and the sexenary counter 21. The complementary output of the decimal timer 20, the output of the sexenary counter 21 and the complementary output of the ½ frequency dividing circuit 18 are fed to the AND gate 23. Further, the output of the decimal timer 20 is fed to a NAND gate 22 and an inverter 42. If the decimal timer 20 has not yet counted 10 clock pulses when the sexenary counter 21 has counted out six clock pulses and the ½ frequency dividing circuit 18 has changed from the high to the low level of output, the output of the AND gate 23 will be at its high level. The sexenary counter 21 and the decimal timer 20 are reset by the output of the AND gate 23 supplied through an inverter 41 and the NAND gate 22, and the ½ frequency dividing circuit 18 is set by this output of the AND gate 23. From this state, the above-described actions are repeated.

Thus, upon receipt of two consecutive output signals of the ternary counter 17 in a certain period of time, the AND gate 23 produces a signal as illustrated in FIG. 2g. Since such an output may also occur when the waves are deformed by noise or some other cause, malfunctioning is further prevented by treating the output as tone signal detecting pulses only when $n_3$ output pulses having come through the above-described process are counted within a certain period of time from the occurrence of the first pulse by the AND gate 23. The time during which $n_3$ pulses ($g_1$ through $g_3$ in FIG. 2g) are counted can be made, as a first method, by opening the gate with the first pulse and by counting clock pulses while it is open (FIG. 2h). A second method is to use another fixed-period timer. The number of counts $n_4$ with which the timing period is obtained by the first method is $N \times (n_3-1) + \beta$, where $\beta$ represents a surplus of detecting time. It is provided that $n_3=3$ and $\beta=3$ in FIG. 1. With these conditions supposed, FIG. 1 will be further explained. The output of the AND gate 23 is fed to the ternary ($3=n_3$) counter-timer 24 (included in an integration circuit 201), whose timer output 28 (FIG. 2h) is fed to one of the input terminals of the AND gate 25 to control the passage of clock pulses fed to the other input terminal. The clock pulses having passed the AND gate 25 are fed to the 19-nary ($19=8\times 2+3=n_4$) timer 26. The count output 29 of the ternary counter-timer (FIG. 2j) and the output of the 19-nary timer 26 (FIG. 2i) are fed to the AND gate 27, and when the ternary counter-timer 24 counts three pulses and produces the ternary counter output 29 before the 19-nary timer 26 completes counting of 19 clock pulses, the AND gate 27 produces, at its output, a tone signal detecting pulse as illustrated in FIG. 2k. The numerals 41 and 42 designate inverters. A signal indicating that the tone signal having passed the N-path filter is the desired one can be obtained in this manner. In the event that, in the above-described embodiment, noise or any other cause prevents either $g_2$ or $g_3$ of FIG. 2g from being produced after $g_1$ has been given, the counter 24 will be reset by the 19-nary timer, and the output from the AND gate 23 will have to be counted again from the beginning. In other words, the lack of one output pulse of the AND gate 23 would result in a waste of time for the 19-nary timer. This would forebode a drop in sensitivity at a lower level of S/N ratio if the duration of tone occurrence is short. To improve this aspect, therefore, the timer period can be extended so that, even if one of the output pulses of the AND gate 23 is lacking, any following output pulse can be detected. This can be readily achieved by selecting an $n_4$ value equal to $2 \times N \times (n_3-1) + \beta$.

Next, a brief explanation will be made concerning attenuation involving tone signals having frequencies differing from the pass frequency of the N-path filter. The N-path filter provides adequate selectivity to discriminate between adjoining tone signals. Leakages of the clock signal frequency fed to the N-path filter are attenuated by the low-pass filter 11. With regard to frequencies equal to twice, three times, four times . . . . . or n times the pass frequency, a relationship of $F_c=8\times f_o$ holds between the frequency of the clock signals and that of the tone signals as stated above. The period of a wave of higher order having a frequency, for instance, twice $f_o$ is ½ of that of the $f_o$ wave, and the wave form is like FIG. 2b'. The period of time during which the AND gate 16 is open would be half as long, and the number of clock pulses that can be counted during the period would be two, unlike the case of $f_o$. Accordingly, the ternary counter 17 does not count out as illustrated in FIG. 2c', and the ½ frequency dividing circuit 18 and any subsequent component does not operate as shown in FIG. 2d'. If, as referred to above, the wave is deformed by noise where the S/N ratio is lower and the open gate period is extended to let three clock pulses pass the gate circuit 16, the normal sequence of actions will be that the ternary counter 17 counts out, the ½ frequency dividing circuit 18 is reversed and the AND gate 19 is opened to feed clock pulses to the sexenary counter 21 and the decimal timer 20. However, since the output pulse of the ternary counter 17 is not produced as usual in the next period, the output of the decimal timer 20 will serve to reset the ½ frequency dividing circuit 18, the decimal timer 20 and the sexenary counter 21 to prevent advance to the next step and, consequently, malfunctioning. Should the noise happen to be so timed as would allow the AND gate 23 to produce an output pulse, the 19-nary timer 26 would limit the time and thereby prevent malfunctioning too. Similarly, no signal detection is possible against tone signals of a frequency equal to three times, four times . . . or n times $f_o$. The above-described circuit would also act against any noise input of a random period to enable the tone signal detector to operate in a stable manner.

In the circuit illustrated in FIG. 1, signal detection is completed in four cycles of tone signals, indicating that the time required for detection varies in proportion to the frequency of tone signals. A variation in detection period means a difference in noise margin, which makes it difficult to set the level of the detecting circuit constant in relation to the frequency of tone signals. A circuit where the detection period is made constant to solve this problem will be described with reference to the embodiment illustrated in FIG. 3.

Figure 3:
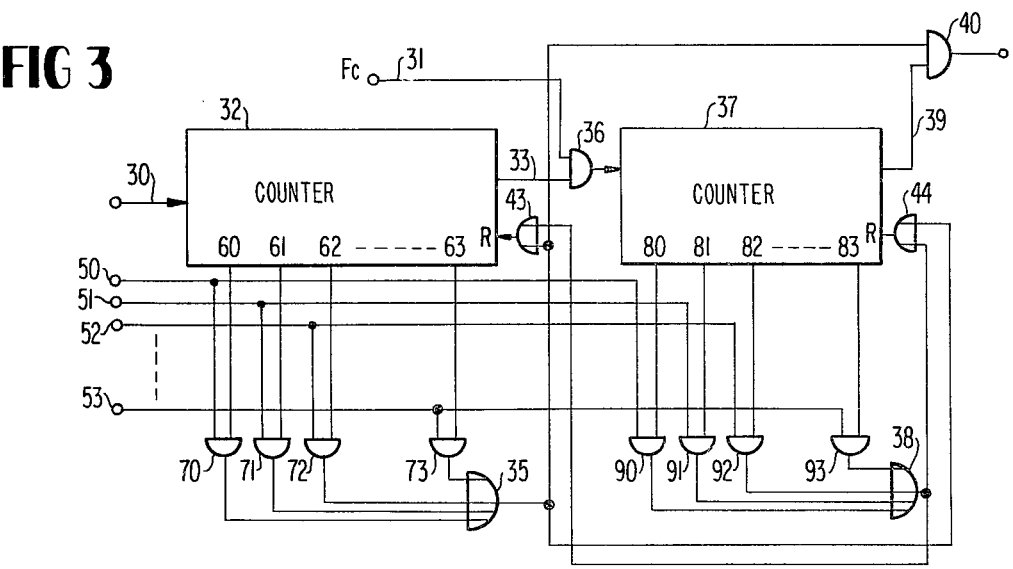
FIG. 3 shows an example of a circuit of a tone signal detector represented by FIG. 1 for making the detecting time of the tone signal constant.

FIG. 3 shows a modification in the part of the circuit of FIG. 1 from the ternary counter 24 and thereafter. In this diagram, numerals 32 and 37 designate counters (for example, CD4022A type Counter/Divider disclosed in the literature: "RCA Integrated Circuits," pp. 413 and 414, April 1976); 36, 40, 70–73 and 90–93 AND gates; 35, 38, 43 and 44, OR gates; 30, the output signal of the AND gate 23 of FIG. 1; 31, clock signal, and 50–53, control signals corresponding to the tone signals to be used. A logic circuit in the counter 32 causes pulses to emerge from one of the terminals 60–63 according to the count of input pulses 30. This output serves, through the AND gates 70–73 the OR gate 35 and the OR gate 43, to reset the counter 32. Similarly the counter 37 counts clock pulses, and pulses emerge from one of the terminals 80–83 according to the count of input pulses. This output serves, through the AND gates 90–93 the OR gate 38 and the OR gate 44, to reset the counter 37. If the time required to receive a tone signal and generatea tone signal detecting pulse from the AND gate 40 is 13 msec, the count $C_{37}$ of the counter 37 will equal $(0.013-1.5\times 1/f_o)\times F_c=(0.013-1.5\times 1/f_o)\times 8\times f_o$, where $1.5\times 1/f_o$ represents the time during which, after the waveform of FIG. 2b is fed to the AND gate 16 and until the AND gate 23 generates a pulse (for instance, pulse $g_1$ of FIG. 2g), the counter 37 is not in action. $C_{37}$ is an integer. The count $C_{32}$ of the counter 32 equals $(C_{37}/8+1)-\gamma$, where $\gamma$ is a value reflecting consideration for possible deformation of tone signal waves by noises. $C_{32}$ is an integer.

With reference to FIG. 3, if $f_o$ is 600 Hz, the count $C_{37}$ will be 50 and $C_{32}$ will be 5 (with $\gamma$ supposed to be 2). The counter 32 is so set that the terminal 60 will count out when five pulses fed to the terminal 30 have been counted. The terminal 80 will count out when 50 clock pulses having passed the AND gate 36 have been counted. To the terminal 50 is given a high level corresponding to the 600 Hz tone signal. The other terminals 51–53 are set at a low level, and keep the AND gates 71–73 and 91–93 closed in accordance with the states of the terminals 61–63 and 81–83. The counter 32 is so composed that, when at least one pulse is given to the terminal 30 from the AND gate 23, a high level will be produced at the terminal 33. This output will open the AND gate 36 to let clock pulses pass and actuate the counter 37. Similarly, the counter 37 is so composed as to be caused by the input clock signal to give a high level to the terminal 39. This state is retained until 50 clock pulses have been counted out to the terminal 80 to reset the counter 37 through the AND gate 90 and the OR gate 38, and the counter 37 serves as a timer during this period of time. As the counter 32 counts out five pulses to the terminal 60 when the timer-counter 37 is not reset, the pulses are fed to the AND gate 40 through the AND gate 70 and the OR gate 35 to cause tone signal detecting pulses to be delivered from the AND gate 40.

Next, if the frequency of tone signals ($f_o$) is 741 Hz, count $C_{37}$ will be $(0.013-1.5\times 1/741)\times 8\times 741=65$ and $C_{32}$ will be $(65/8+1)-2=7$. Accordingly, the terminals 61 and 81 are set at 7 and 65, respectively. To the terminal 51 will be given a high level corresponding to the 741 Hz tone signals, and to the other terminals 50, 52 and 53, low levels. Arrangement will be so made as to have the outputs of the terminals 61 and 81 reset the counters 32 and 37, respectively. By similarly setting the other terminals 62, 63, 82 and 83, the tone signal detecting time can be kept constant (at 13 msec) almost irrespective of the frequency.

The use of an N-path filter and a digital circuit in accordance with the present invention as described above makes possible large-scale integration with CMOS to raise the packaging efficiency of the system. Integration further contributes to increasing the reliability of circuits, and facilitates composition of more economical circuits which permits mass-production.

What is claimed is:

1. A tone signal detector for receiving and detecting tone signals comprising:
   a clock signal generator for generating clock pulses of a frequency equal to N times the frequency of said tone signals, where N is an integer equal to or greater than 2;
   an N-path filter for sampling and selecting said tone signals according to the output signals of said clock signal generator;
   a low-pass filter connected to said N-path filter for eliminating the component of the frequency of said cook pulses included in the sampled tone signals;
   a wave shaping circuit for shaping the signals having passed said low-pass filter to produce pulses;
   a gate circuit for controlling the passing of said clock pulses in accordance with the output pulses of said wave shaping circuit;
   a counter for counting the number of the output pulses of said gate circuit; and
   means responsive to said clock pulses and the output of said counter for detecting whether or not said tone signals are the designated signals by the count of said counter in a prescribed period of time.

2. A tone signal detector as claimed in claim 1 wherein said integration means comprises means capable of varying said preset number in accordance with the frequency of said tone signals.

3. A tone signal detector as claimed in claim 1 wherein said means for detecting comprises:
   frequency decision means connected to the output of said counter and controlled thereby to count said clock pulses and produce an output if the number n of clock pulses counted during the output period of said first counter satisfies the relation $N-\alpha \leq n \leq N+\alpha$, where $\alpha$ is a predetermined constant less than N; and integration means connected to the output of said frequency decision means and controlled thereby to count said clock pulses and produce an output if a preset number of outputs are produced by said frequency decision means within said prescribed period of time.

* * * * *

UNITED STATES PATENT AND TRADEMARK OFFICE
CERTIFICATE OF CORRECTION

PATENT NO. : 4,231,018
DATED : October 28, 1980
INVENTOR(S) : Masayuki IMIGAWA et al.

It is certified that error appears in the above—identified patent and that said Letters Patent is hereby corrected as shown below:

Column 6, line 61, delete "1" and insert -- 3 -- .

Signed and Sealed this

Nineteenth Day of May 1981

[SEAL]

Attest:

RENE D. TEGTMEYER

Attesting Officer     Acting Commissioner of Patents and Trademarks